Figure 1:
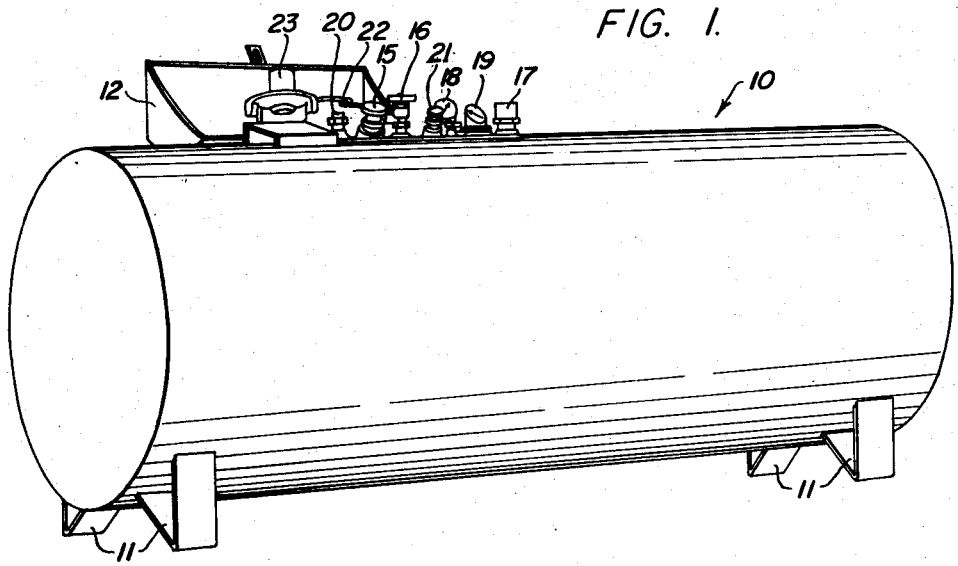

July 12, 1960 T. HATANAKA 2,944,701
LIQUID FILL STRUCTURE FOR LP GAS TANKS
Filed May 8, 1958 4 Sheets-Sheet 1

Inventor
TAD HATANAKA

Attorneys

July 12, 1960 T. HATANAKA 2,944,701
LIQUID FILL STRUCTURE FOR LP GAS TANKS
Filed May 8, 1958 4 Sheets-Sheet 2

INVENTOR.
TAD HATANAKA
BY
ATTORNEYS

INVENTOR.
TAD HATANAKA
BY
ATTORNEYS

United States Patent Office 2,944,701
Patented July 12, 1960

2,944,701
LIQUID FILL STRUCTURE FOR LP GAS TANKS

Tad Hatanaka, Salt Lake City, Utah, assignor, by mesne assignments, to Union Tank Car Company, a corporation of New Jersey Filed May 8, 1958, Ser. No. 734,030
7 Claims. (Cl. 220—85)

This invention relates to consumer supply tanks for liquified petroleum gas, such tanks being commonly referred to as LP gas tanks. It is concerned particularly with the provision made in such tanks for filling and refilling them with the liquified gas.

Liquified petroleum gas, a mixture of butane and propane, is widely used for both industrial and domestic purposes. While so-called "cylinders" are commonly employed to package such gas for the small consumer, it is usually much more economical for both small and large users to maintain relatively large supply tanks and to have them filled from time to time, as required, from transport delivery vehicles, such as tank trucks.

The supply tanks are normally of cylindrical configuration, and are supported horizontally on legs or concrete piers. They are connected by suitable feed lines to whatever equipment requires the gas for fuel. The most popular size for domestic use has a capacity of 500 gallons, though many other sizes, both larger and smaller, are commonly used.

The gas is delivered and introduced into a supply tank in its liquified condition, and is maintained in that condition until immediately prior to withdrawal for use. The tank is filled with the liquified gas only to approximately 80% of its capacity, the remainder of the tank capacity above the level of liquid providing a vapor zone from which gaseous vapors are supplied to the consuming equipment. A tank is ordinarily re-filled when the liquid level drops to approximately 10 to 20% of its total capacity. Pressure does not vary significantly with change in liquid level, but it does vary considerably with variations in ambient temperature.

During filling of the tank with liquified gas from a delivery vehicle, vapor from the vapor zone is often concurrently returned to the delivery tank so as to equalize the pressure and facilitate the delivery operation. However, it has been found that this makes accurate measure of quantity delivered almost impossible, and many of the states of this country have already passed laws prohibiting such practice. This means that re-filling of storage tanks must be done against the pressure maintained in such tanks.

At a temperature of 60° Fahrenheit, the pressure is about 94 pounds per square inch. At 100° Fahrenheit, the pressure jumps to about 175 p.s.i. The time required for a re-filling operation is dependent to a great extent upon this back-pressure, which must be overcome by the pumping equipment utilized in transferring the liquid from delivery tank to storage tank.

Various fittings and gauges are ordinarily provided on the supply tank for use in filling operations and for indicating to the user quantity and pressure of the contents. They are often grouped together in common on a mounting structure referred to in the art as an "island bar." Such mounting structure is customarily formed independently of the tank, and is fitted into a suitable receiving aperture therein and welded rigidly and tightly in place.

In some instances such mounting structure is of disk formation, being fitted in and welded to one end or head of the horizontally extending tank just above the normal level of liquified gas. In other instances it is of elongated plate formation, and is installed either horizontally, within and along the arcuate top of the tank and tangent to the curvature thereof with its longitudinal center line coincident with the vertical axis of the tank, or is installed in a similar manner considerably forward of such vertical axis of the tank so as to be in front and provide convenience of filling and of viewing the gauges in much the same way as does the first-mentioned structure in the end of the tank.

These filling and viewing advantages of both the end and of the front, or, as it is often termed, "shoulder," placement of the island bar structure are not present in the top placement thereof, but, despite this, the top location is preferred by many manufacturers and users on the basis of both safety and cost. The end and the front or shoulder mountings present hazards in overfilling and require the use of more expensive gauges. Also, protective hoods associated therewith do not satisfactorily shed rain and melting snow.

The principal object of this invention is to facilitate re-filling of a standard, horizontally disposed, cylindrical, LP gas storage tank having fill structure at its top, without the use of any vapor return.

In the accomplishment of this object, an outstanding feature of the invention resides in the fact that the fill fitting utilized to receive the nozzle of the delivery hose has the longitudinal axis of its nozzle-receiving opening disposed at an angle to the vertical axis of the tank effective to direct the stream of inflowing liquid toward the arcuate side wall of the tank, rather than directly toward the bottom as is customary. In this way, a spiral swirling motion of the liquified gas is set up about the circumferential walls of the tank during the filling operation, which, by greatly increasing both the liquid-vapor contact area and the liquid-metal contact area, dissipates heat through the tank wall and lowers both temperature and gas pressure. With lower gas pressure, the filling operation is speeded up.

The orientation of the nozzle-receiving opening of the fill fitting makes it structurally convenient to forwardly slope the outer face of such fitting, which greatly facilitates introduction and attachment of the hose nozzle by an attendant standing beside the tank. It also minimizes chances of kinking the hose and of thereby interfering with free flow of liquid therethrough.

In line with the above, a further object of the invention is to provide a novel island bar structure for incorporation in LP gas supply tanks in conventional manner to achieve the advantages and results here disclosed.

Further objects and features of the invention will become apparent from the following detailed description of the presently preferred specific embodiment illustrated in the accompanying drawings.

Figure 3:
Figure 2:
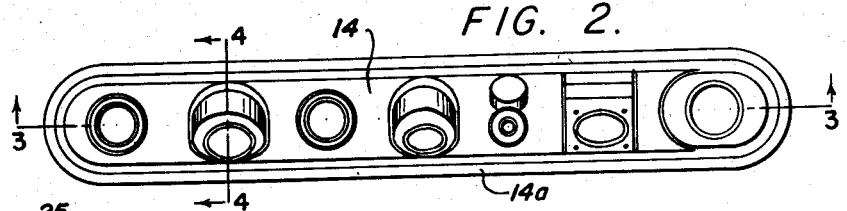
Figure 5:
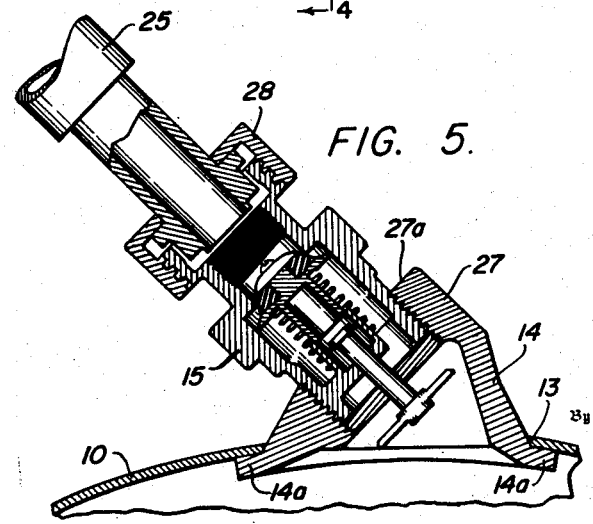
Figure 4:
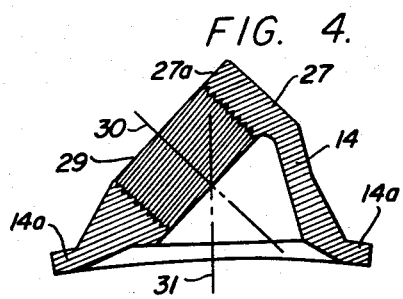
Figure 7:
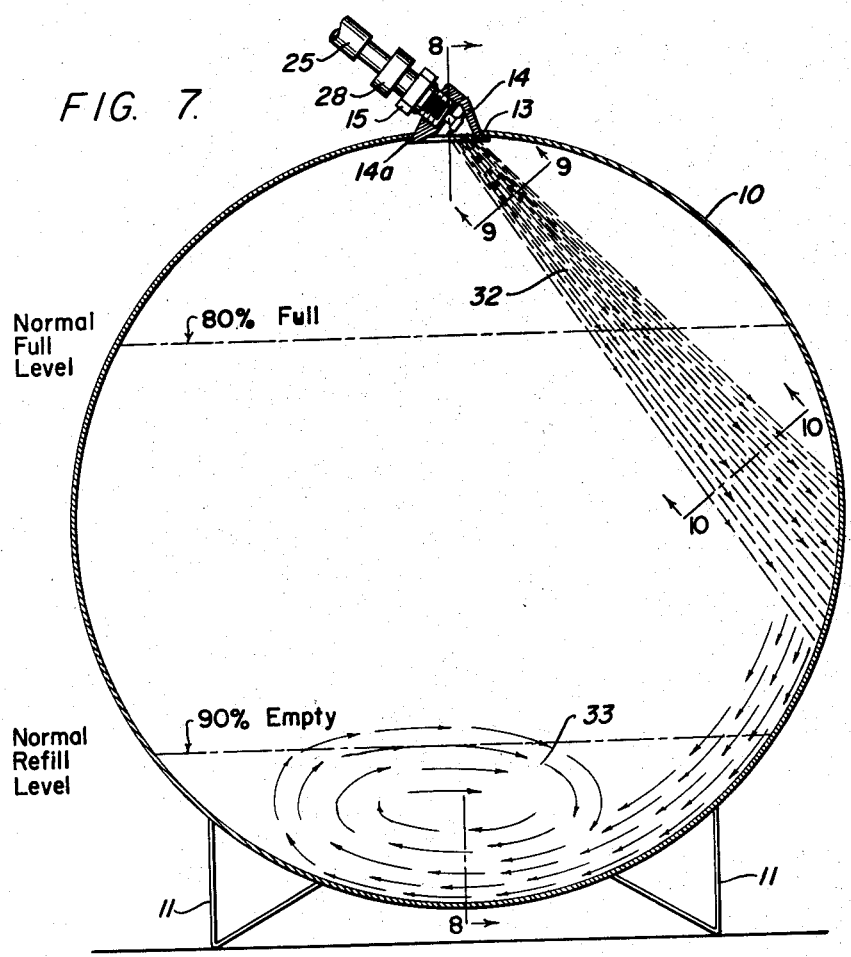
Figure 6:
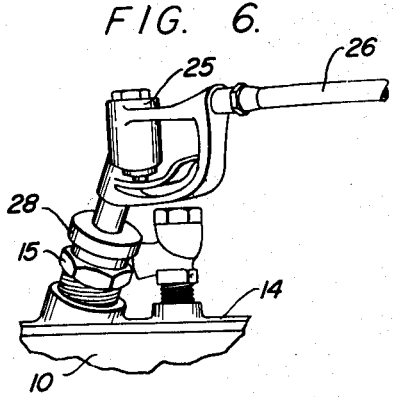
Figure 8:
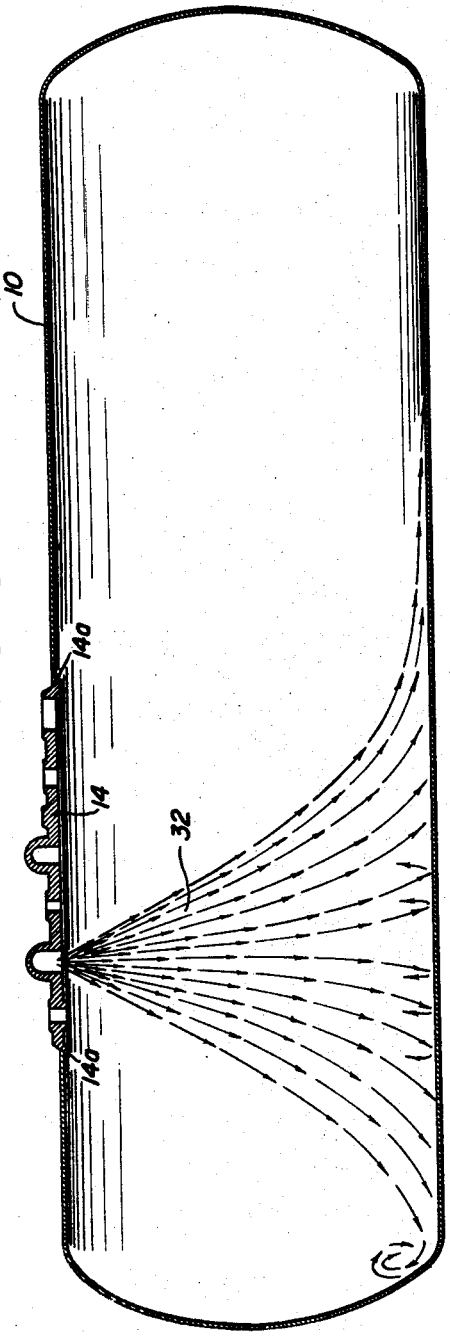
Figure 10:
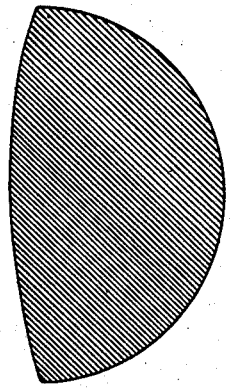
Figure 9:

In the drawings:

Fig. 1 represents a front perspective view of an LP gas storage tank and island bar embodying the invention, the protective hood being shown swung back out of the way as it is for purposes of filling the tank and of reading the gauges;

Fig. 2, a top plan view of the island bar per se, minus thereto-attached fittings;

Fig. 3, a longitudinal, vertical section taken on the line 3—3 of Fig. 2;

Fig. 4, a transverse vertical section taken on the line 4—4 of Fig. 2 and drawn to a scale enlarged over that of Figs. 2 and 3;

Fig. 5, a view corresponding to that of Fig. 4, but with the island bar installed in the tank, as in Fig. 1, the fill valve being shown in place with a fill nozzle connected thereto, as it is during a filling operation, both the tank and the fill nozzle being shown fragmentarily;

Fig. 6, a fragmentary perspective view showing the fill hose and nozzle attached to the fill valve for the purpose of replenishing the tank with LP gas, this view being drawn to approximately the scale of Figs. 2 and 3;

Fig. 7, a view corresponding to but drawn to a smaller scale than Fig. 5 and illustrating the fill valve and attached nozzle in elevation and the tank in full, arrows being appended to indicate the general path of circulation of the inflowing liquified petroleum gas within the tank;

Fig. 8, a longitudinal, vertical section taken on the line 8—8 of Fig. 7, but drawn to a reduced scale;

Fig. 9, a section taken along the line 9—9 of Fig. 7;

Fig. 10, a similar section taken along the line 10—10 of Fig. 7; and

Figure 11:
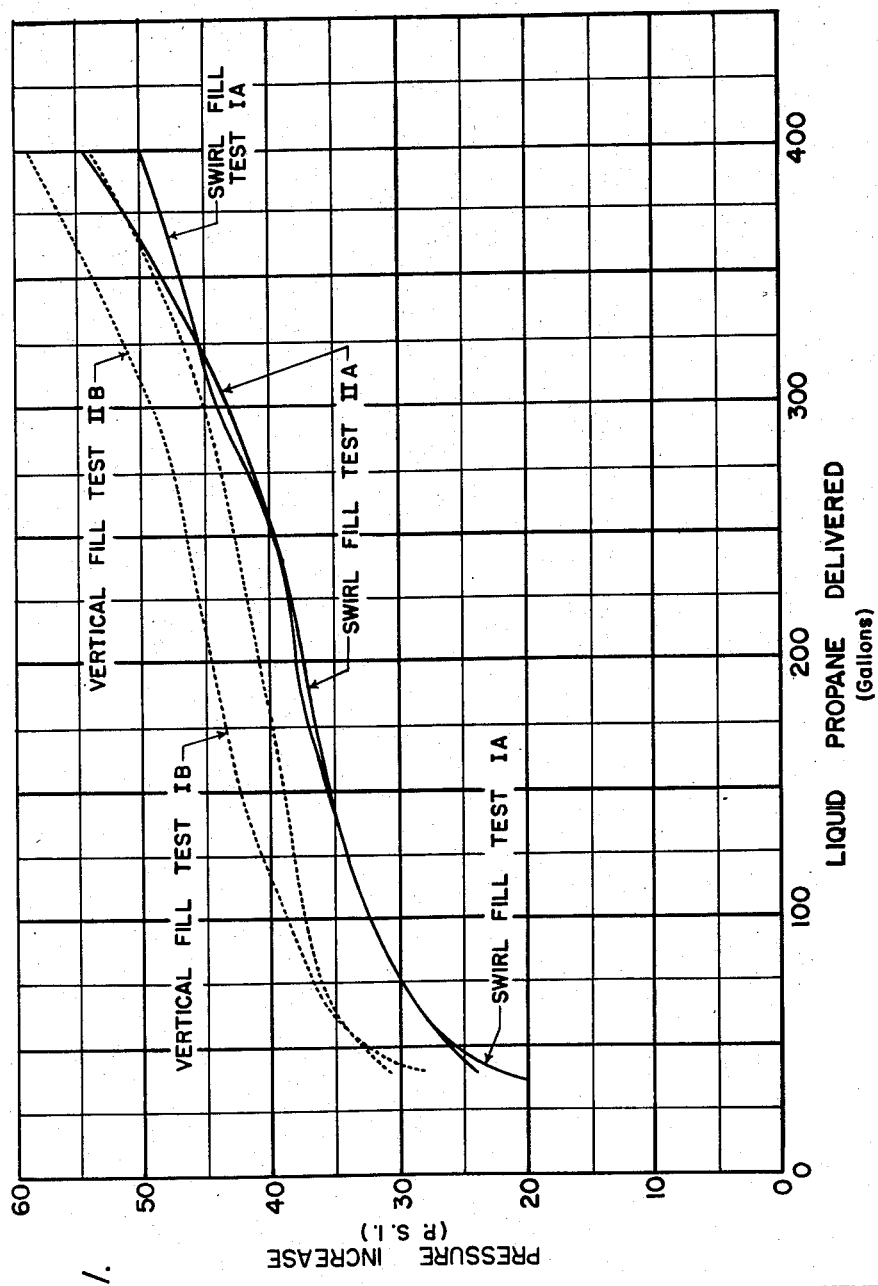

Fig. 11, a graph showing the results of comparative tests conducted to determine filling speed in accordance with the invention as against conventional practice.

Referring now to the drawings:

The tank 10 is, in and of itself, a type conventional in the art. It is provided with legs 11, Fig. 1, which support it with its longitudinal axis extending horizontally. A protective hood 12 is provided in customary manner to protect valves and instruments both from the weather and from being tampered with by unauthorized persons.

Within a receiving aperture 13, Figs. 5 and 7, is secured, as by welding, an island bar 14 having uniquely advantageous characteristics in conformity with the invention.

As is customary in tanks of this kind, the island bar 14 is preferably forged from steel to provide for the mounting of various valves and gauges required in the filling and use of the tank. The base of the island bar is flanged, as at 14a, to provide suitable bearing surface against the inner wall surface of the tank, for the attachment weld. The remainder of the island bar projects upwardly through the receiving aperture 13 and is exposed exteriorly of the tank, as shown.

The aperture 13 and the therein-received, island bar 14 are disposed in the preferred top location, within and along the arcuate top of the tank and tangent to the curvature thereof. They have their longitudinal center lines more or less coincident with the vertical axis of the tank.

As shown in Fig. 1, the tank 10 is provided with various utility valves, gauges, and fittings, including in this instance a customary fill valve 15, service valve 16, relief valve 17, pressure gauge 18, liquid-level gauge 19, and liquid-withdrawal fitting 20, all screwed into respective receiving apertures formed in island bar 14. Although pressure equalization is normally not required during the filling of an LP tank embodying the invention, the customary vapor return valve 21 may be provided in case special circumstances make its use desirable.

A conventional "pig-tail" 22 connects the service line from service valve 16 with the usual pressure regulator 23.

Inasmuch as the invention is concerned primarily with tank fill structure effective to produce new results in the filling of the tank with the LP gas which it is designed to store for use at the convenience of a consumer, the manner in which fill valve 15 is mounted in island bar 14 becomes of paramount importance.

Island bar 14 and its receiving recess 13 in the tank 10 are of elongated form, being narrow, respectively, relative to their lengths.

As previously mentioned, the island bar is preferably a steel forging wholly integral in itself. Its base flange 14a extends continuously about the periphery, projecting outwardly so as to bear closely against the under peripheral margin of the tank wall which defines receiving opening 13. In this way, the island bar is secured to and in sealed relationship with the tank by welding in the usual manner.

For properly mounting the fill valve 15 in relation to the tank proper, so that the incoming liquified petroleum gas from the usual valve nozzle 25, Fig. 6, of a delivery hose 26 will be directed against the rearward portion of the circumferential wall of the tank at a level above the normal re-fill level, island bar 14 is formed with a forwardly sloping platform 27, Figs. 4 and 5, rising upwardly from base level and projecting outwardly when the island bar is incorporated in the tank.

Such platform 27 has its upper, valve-mounting face 27a directed forwardly at an angle effective to minimize kinking of the delivery hose 26 when the valve nozzle 25 is temporarily fastened to the fill valve by means of coupling nut 28, Figs. 5 and 6, in the usual manner.

Platform 27 is bored and tapped, as at 29, Fig. 4, for receiving and screw-threadedly anchoring fill valve 15 in suitable angular position. The angle that the longitudinal axis 30 of such bore makes with the vertical axis 31 of the tank proper may vary within reasonable limits in order to accomplish the desired results, but, in all instances, is such as to direct the stream of inflowing liquified gas from nozzle 25 against the rear portion of the circumferential wall of the tank proper at or above the normal refill level it being realized that the longitudinal axis of the fill valve 15 as installed is coincident with the longitudinal axis of bore 29. Such refill level, indicated as such in Fig. 7, is customarily considered to be about that at which the tank is 90 percent empty.

Considering practical problems of forging the island bar 14, the most advantageous angle between axes 30 and 31 for accomplishing the objectives of the invention is approximately 45°. This not only causes the incoming stream 32, Fig. 7, of liquid to strike the rear wall portion of tank 10 at a very advantageous location, namely, about at the horizontal axis of such tank proper, as shown, but, when valve-mounting face 27a of platform 27 is perpendicular to the longitudinal axis of bore 29, as is preferred, places such mounting face at a most advantageous inclination for convenience of hose nozzle connection, see Fig. 6.

With the island bar 14 constructed in this manner, installation thereof in the preferred top location of the tank 10, as shown, causes the stream 32 of inflowing liquid to contact and to flow in intimate, heat-transfer relationship with the circumferential wall of the tank, somewhat as indicated in Figs. 7 and 8, such stream having approximately the cross sectional configurations shown in Figs. 9 and 10 and the forceful flow thereof after impingement against the tank wall establishing approximately the turbulent, spiral, flow pattern indicated at 33, Fig. 7, in the remaining liquid in the tank.

Both the contact of such stream 32 with the walls of the tank and the turbulence established in the liquid already in the tank and continuing as the tank fills with liquid to the 80% full level, promote rapid heat transfer from the inflowing liquified gas and tend to keep it liquified during the filling operation. This minimizes pressure build-up within the tank and means that the filling operation can proceed more rapidly than would otherwise be the case.

Tank filling advantages of the invention have been demonstrated by actual comparative tests. In these tests, two horizontally disposed cylindrical tanks were used. One of these, having a capacity of 1000 gallons, was equipped as a supply tank with a Smith Truck Pump No. TC-3 (100 g.p.m.) and a Neptune 2" type "D" gallonage meter with a #431 register. The pump was driven by a five horse-power electric motor whose speed was reduced to 500 r.p.m. by suitable speed-reducing mechanism. The other tank, having a capacity of 500 gallons, was used as the test tank to be filled from the supply tank. It was equipped with an island bar corresponding to that afore-described, except for the provision of an additional, conventional fill valve disposed vertically as compared with the one conforming to the invention at 45° to the vertical.

Transfer of liquified gas from the supply tank to the test tank was made with 50 feet of 1¼ inch hose, connected first to the fill valve of the invention for the running of one test and then to the conventional fill valve for the running of the comparative test.

Pressure in the tanks was equalized by means of a one inch vapor hose before each of the tests. Such hose was then disconnected, and 400 gallons of the liquified gas was continuously pumped from the supply tank into the test tank. Readings of pressure of both the supply and test tanks and of gallonage delivered from the one to the other were taken at half minute intervals.

Typical test results are shown in the following tables and are compared graphically in Fig. 11:

Table I
TEST IA
[Swirl fill.]

| Filling Time, Minutes | Liquid Transfer | Test Tank Press., p.s.i. | Del. Tank Press., p.s.i. | Press. Differential, p.s.i. |
|---|---|---|---|---|
| 0 | 0 | 130 | 130 | 0 |
| .5 | 36 | 135 | 115 | 20 |
| 1.0 | 70 | 147 | 117.5 | 29.5 |
| 1.5 | 102 | 151 | 117.5 | 33.5 |
| 2.0 | 137 | 152 | 117.5 | 34.5 |
| 2.5 | 160 | 154 | 117.5 | 36.5 |
| 3.0 | 183 | 155 | 117.5 | 37.5 |
| 3.5 | 205 | 156 | 117.5 | 38.5 |
| 4.0 | 226 | 156 | 117.5 | 38.5 |
| 4.5 | 246 | 157 | 117.5 | 39.5 |
| 5.0 | 265 | 158 | 117.5 | 40.5 |
| 5.5 | 283 | 158 | 117.5 | 40.5 |
| 6.0 | 300 | 159 | 115 | 44 |
| 6.5 | 217 | 160 | 115 | 45 |
| 7.0 | 333 | 161 | 115 | 46 |
| 7.5 | 348 | 162 | 115 | 47 |
| 8.0 | 363 | 163 | 115 | 48 |
| 8.5 | 377 | 163 | 115 | 48 |
| 9.0 | 391 | 154 | 115 | 49 |
| 9.4 | 400 | 165 | 115 | 50 |

TEST IB
[Conventional vertical fill.]

| | | | | |
|---|---|---|---|---|
| 0 | 0 | 130 | 130 | 0 |
| .5 | 42 | 134 | 105 | 29 |
| 1.0 | 70 | 134 | 98 | 36 |
| 1.5 | 92 | 134.5 | 97.5 | 37 |
| 2.0 | 113 | 135 | 97.5 | 37.5 |
| 2.5 | 132 | 136 | 97.5 | 38.5 |
| 3.0 | 151 | 136.5 | 97.5 | 39 |
| 3.5 | 169 | 137 | 97.5 | 39.5 |
| 4.0 | 186 | 137.5 | 97 | 40.5 |
| 4.5 | 203 | 138 | 97 | 41 |
| 5.0 | 220 | 138.5 | 97 | 41.5 |
| 5.5 | 236 | 138.5 | 97 | 41.5 |
| 6.0 | 252 | 139 | 96 | 43 |
| 6.5 | 268 | 139 | 96 | 43 |
| 7.0 | 283 | 140 | 96 | 44 |
| 7.5 | 298 | 141 | 96 | 45 |
| 8.0 | 312 | 141.5 | 96 | 45.5 |
| 8.5 | 326 | 142.5 | 95 | 47.5 |
| 9.0 | 339 | 143.5 | 95 | 48.5 |
| 9.5 | 352 | 144 | 95 | 49 |
| 10.0 | 364 | 145 | 95 | 50 |
| 10.5 | 376 | 146.5 | 95 | 51.5 |
| 11.0 | 387 | 147.5 | 95 | 52.5 |
| 11.5 | 397 | 148.5 | 95 | 53.5 |
| 11.62 | 400 | 149 | 95 | 54 |

Table II
TEST IIA
[Swirl fill.]

| Filling Time, Minutes | Liquid Transfer | Test Tank Press., p.s.i. | Del. Tank Press., p.s.i. | Press. Differential p.s.i. |
|---|---|---|---|---|
| 0 | 0 | 120 | 120 | 0 |
| .5 | 41 | 130 | 106 | 24 |
| 1.0 | 74 | 135 | 106 | 29 |
| 1.5 | 106 | 138.5 | 106 | 32.5 |
| 2.0 | 135 | 141 | 107 | 34 |
| 2.5 | 157 | 141.5 | 106.5 | 35 |
| 3.0 | 177 | 143 | 106.5 | 37 |
| 3.5 | 197 | 144 | 106 | 38 |
| 4.0 | 215 | 145 | 106 | 39 |
| 4.5 | 233 | 146.5 | 106 | 40.5 |
| 5.0 | 250.5 | 147 | 106 | 41 |
| 5.5 | 267 | 147.5 | 105.5 | 42 |
| 6.0 | 283 | 148 | 105 | 43 |
| 6.5 | 298 | 148.5 | 105 | 43.5 |
| 7.0 | 312 | 149 | 105 | 44 |
| 7.5 | 326 | 150 | 105 | 45 |
| 8.0 | 340 | 151 | 104 | 47 |
| 8.5 | 352 | 152.5 | 103 | 49.5 |
| 9.0 | 364 | 153.5 | 103 | 50.5 |
| 9.5 | 375 | 154.5 | 103 | 51.5 |
| 10.0 | 386 | 155.5 | 103 | 52.5 |
| 10.5 | 396 | 156.5 | 102.5 | 54 |
| 10.72 | 400 | 157 | 102.5 | 54.5 |

TEST IIB
[Conventional vertical fill.]

| | | | | |
|---|---|---|---|---|
| 0 | 0 | 120 | 120 | 0 |
| .5 | 41 | 133 | 102.5 | 30.5 |
| 1.0 | 73 | 139 | 102.5 | 36.5 |
| 1.5 | 98 | 141 | 103 | 38 |
| 2.0 | 118 | 143 | 103 | 40 |
| 2.5 | 137 | 144 | 103 | 41 |
| 3.0 | 155 | 145 | 102.5 | 42.5 |
| 3.5 | 172.5 | 145.5 | 102.5 | 43 |
| 4.0 | 189 | 146.5 | 102.5 | 44 |
| 4.5 | 206 | 147 | 102.5 | 44.5 |
| 5.0 | 221 | 148 | 102.5 | 45.5 |
| 5.5 | 237 | 148.5 | 102.5 | 46 |
| 6.0 | 251 | 149 | 102.5 | 46.5 |
| 6.5 | 266 | 149.5 | 102 | 47.5 |
| 7.0 | 279 | 150 | 102 | 48 |
| 7.5 | 293 | 151 | 102 | 49 |
| 8.0 | 306 | 152 | 102 | 50 |
| 8.5 | 318 | 153 | 101.5 | 51.5 |
| 9.0 | 330 | 154 | 101.5 | 52.5 |
| 9.5 | 341 | 155 | 101.5 | 53.5 |
| 10.0 | 352 | 155.5 | 101.5 | 54 |
| 10.5 | 362 | 156.5 | 101 | 55.5 |
| 11.0 | 372 | 157 | 101 | 56 |
| 11.5 | 381 | 157.5 | 101 | 56.5 |
| 12.0 | 390 | 158.5 | 101 | 57.5 |
| 12.5 | 398 | 159.5 | 101 | 58.5 |
| 12.62 | 400 | 160 | 101 | 59 |

From these tests, it can be seen that the swirl filling of the invention reduces internal pressure by from one to seven and a half pounds per square inch and enables a tank to be filled from one to twenty-four gallons per minute faster than conventional vertical filling. Moreover, it was much easier to couple and uncouple the hose with the swirl filling, and there was no bending nor kinking of the hose. The pump load was reduced up to 7.6%, which means longer life for the pump.

By this invention, the inside surface of the tank shell is washed and a swirling motion is set up substantially the entire length of the tank. Heat is dissipated through the tank wall by convection of the liquified gas. Inasmuch as the thermal conductivity of metal in contact with liquid is approximately ten times more than it is in contact with vapor, the whole tank is subject to rapid temperature drop according to Fourier's law. This lowers the pressure.

Whereas this invention is here illustrated and described in detail with respect to a preferred construction thereof, it is to be understood that various modifications and adaptations may be resorted to by those skilled in the art without departing from the essential inventive concepts.

I claim:

1. In a storage tank arrangement for highly volatile fluids, an elongated cylindrical tank, said tank having an opening formed in a side thereof, a bar element positioned in said opening to close same and secured to the tank, a plurality of upraised bosses on said element, said bosses having generally flat surfaces thereon with apertures therein to accommodate fitting mountings communicating with the inside of said tank, certain of said surfaces being angularly related to the other of said surfaces.

2. A storage tank arrangement according to claim 1, wherein said opening and element are elongated, said bosses being formed on said element in tandem relationship to each other and aligned with the long axis of said element.

3. A storage tank arrangement according to claim 2, wherein said cylindrical tank is horizontally positioned, said opening and said element being located at the top of said tank as seen in elevational view and aligned with the long axis of said tank as seen in plan view.

4. In an LP storage tank arrangement, a horizontally aligned, elongated, cylindrical tank, an elongated opening in the cylindrical side wall of said tank, a bar element positioned in said opening and peripherally welded to said side wall, a plurality of bosses on said element and projecting upwardly through said opening and above the cylindrical surface of said side wall, said bosses having mounting surfaces thereon having threaded fitting-receiving apertures therein, certain of said apertures having axes approximately perpendicular to and intersecting the longitudinal axis of said tank, other of said apertures having axes angularly arranged relative to the axes of said certain apertures as seen in end elevational view.

5. In an LP storage tank arrangement, a horizontally aligned, elongated, cylindrical tank, an elongated opening in the cylindrical side wall of said tank, a bar element positioned in said opening and peripherally welded to said side wall, a plurality of bosses on said element projecting upwardly through said opening and above the cylindrical surface of said side wall, threaded fitting-receiving apertures in said bosses communicating with the internal portion of said tank, the axis of the aperture in at least one of said bosses being arranged to intersect the cylindrical side wall of said tank at a point whereat said axis is in acute angular relationship with a line tangent to said cylindrical side wall at said point, said last mentioned boss having a cavity therein below said aperture and above the surface of said cylindrical side wall as seen in elevational view.

6. In an LP storage tank arrangement, a generally horizontally related enclosed tank having a generally cylindrical wall, means defining an elongated opening in the tank wall adjacent its upper portion, an elongated bar element fixedly secured to said wall to close said opening means, boss means projecting outwardly from one side of said element and extending outwardly relative to said opening means, and means in said boss means defining a plurality of apertures adapted to receive mounting fittings for communicating with the interior of the tank, said plurality of apertures including a filling aperture, the axis of said filling aperture means being oriented to intersect at an acute angle a substantially vertical wall portion which is exposed to the filling liquid during at least half of the filling time of the tank to direct the filling liquid downwardly over the wall to effect a cooling of the filling liquid with the attendant reduction in tank pressure, said boss means including a cavity located outwardly of the wall of said tank in communication with said last-mentioned aperture means.

7. In an LP storage tank arrangement, a generally horizontally related enclosed tank having a generally cylindrical wall, means defining an elongated opening in the tank wall adjacent its upper part of said tank, an elongated bar element fixedly secured to said wall to close said opening means, said bar element including peripheral flange means abutting against the inner surface of the tank wall, boss means extending away from one side of said flange means to project outwardly through said opening means outside of the tank wall, means defining a plurality of apertures adapted to receive mounting fittings for communicating with the interior of the tank, said plurality of apertures including a filling aperture, the axis of said filling aperture means being arranged to intersect at an acute angle a substantially vertical portion of the wall, said vertical portion being exposed to the filling liquid while the tank is between an empty and approximately a half full condition to cause the liquid to pass downwardly over the unexposed part of the wall into the stored liquid so that the filling liquid is cooled with the attendant reduction in tank pressure, and means in said boss means defining a cavity located outwardly of the tank wall and inwardly of said last-mentioned aperture means for providing communication between said last-mentioned aperture means and the interior of said tank.

References Cited in the file of this patent
UNITED STATES PATENTS

| | | |
|---|---|---|
| 2,056,828 | Clawson | Oct. 6, 1936 |
| 2,623,362 | Zerbe | Dec. 30, 1952 |
| 2,753,098 | Ward | July 3, 1956 |